United States Patent [19]
Odendahl et al.

[11] Patent Number: 5,309,080
[45] Date of Patent: May 3, 1994

[54] CONTROL UNIT FOR BATTERY-OPERATED DEVICE

[75] Inventors: Alfred Odendahl, Waldenbuch; Armin Fiebig, Leinfelden-Echterdingen, both of Fed. Rep. of Germany

[73] Assignee: Robert Bosch GmbH, Stuttgart, Fed. Rep. of Germany

[21] Appl. No.: 856,060

[22] PCT Filed: Sep. 29, 1990

[86] PCT No.: PCT/DE90/00745
§ 371 Date: Jun. 8, 1992
§ 102(e) Date: Jun. 8, 1992

[87] PCT Pub. No.: WO91/07801
PCT Pub. Date: May 30, 1991

[30] Foreign Application Priority Data
Nov. 8, 1989 [DE] Fed. Rep. of Germany ....... 3937158

[51] Int. Cl.5 .............................................. H02J 7/10
[52] U.S. Cl. ........................................ 320/35; 320/13
[58] Field of Search ............................ 320/35, 36, 13

[56] References Cited

U.S. PATENT DOCUMENTS

| | | | |
|---|---|---|---|
| 3,917,990 | 11/1975 | Sherman, Jr. ........................ | 320/35 |
| 3,940,679 | 2/1976 | Brandwein et al. .................. | 320/48 |
| 4,255,698 | 3/1981 | Simon ................................... | 320/35 |
| 4,328,457 | 5/1982 | Higuchi ................................ | 320/36 |
| 4,507,368 | 3/1985 | Hashimoto ........................... | 429/62 |
| 4,642,600 | 2/1987 | Gummelt et al. ................ | 320/35 X |
| 4,667,140 | 5/1987 | Sweetman ........................ | 320/35 X |
| 4,755,735 | 7/1988 | Inakagata ............................. | 320/35 |
| 4,897,322 | 1/1990 | Jessen ............................... | 320/35 X |

FOREIGN PATENT DOCUMENTS

| | | |
|---|---|---|
| 2520599 | 11/1976 | Fed. Rep. of Germany . |
| 2738977 | 3/1979 | Fed. Rep. of Germany . |
| 3321814 | 1/1985 | Fed. Rep. of Germany . |
| 2088158 | 6/1982 | United Kingdom . |

*Primary Examiner*—R. J. Hickey
*Attorney, Agent, or Firm*—Frishauf, Holtz, Goodman & Woodward

[57] ABSTRACT

A control unit for a battery-operated device is proposed which via an existing control connection recognizes an overload of the battery and/or of the electric device. The control connection of a temperature-dependent resistor is used, which is thermally connected to the rechargeable battery. This connection, which is typically usable to control a charging unit, now serves during the battery operation of the electric device as a control output for monitoring the battery temperature. Since the temperature gradient is also detected, this signal can also be used to monitor the overload of the electric device, which for instance is an electric motor.

20 Claims, 2 Drawing Sheets

CONTROL UNIT FOR BATTERY-OPERATED DEVICE

FIELD OF THE INVENTION

The invention relates generally to a control unit for a battery-operated device.

BACKGROUND:

It is known that battery-operated devices that are equipped with rechargeable batteries are, connected to a charging unit for recharging the battery. The charging units are often equipped in such a way that they can be used for fast charging of the battery. In fast battery charging, however, considerable heating of the battery occurs toward the end of the charging process, to indicate that the battery is charged. A temperature sensor is connected to the battery by a thermal coupling to protect the battery against damage, such as overcharging. The temperature sensor detects the battery temperature so that the charging unit is turned off once a limit temperature is reached.

In practice, this means that charging the battery requires at least a third line, which leads to a corresponding control input to the charging unit. During battery operation of the electric unit, this control line is not needed.

From German Patent Application 25 20 599 (A1), assigned to General Electric Co. a circuit arrangement for charging storage batteries is known in which the temperature of both the storage battery and its surroundings is measured The charging current is determined as a function of the temperature difference.

From British Patent 2,088,158, corresponding to U.S. Pat. No. 4,507,368 a battery unit is known in which a bimetallic switch is thermally coupled to the battery, and when a temperature limit value is reached, it can interrupt the current circuit to the battery, both in charging and discharging operation.

THE INVENTION

The control unit according to the invention, has the advantage over the prior art that the control line not used in battery operation can now be used for other functions It is especially advantageous that monitoring of the battery with respect to drawing too much current during battery operation of the unit is possible.

It is especially advantageous that the evaluation circuit reacts to temperature changes of the temperature sensor. Since the temperature of the battery changes relatively slowly, brief interfering signals can easily be stabilized, so that if a predetermined limit value is exceeded, the output signal is still reliable. Particularly simple evaluation circuits are obtained if comparators are used, to the output of which suitable displays can be connected without major effort.

It is also advantageous that the evaluation circuit not only detects the static temperature but also measures the temperature gradient, so that it can evaluate a rapid or not so rapid temperature rise. The temperature gradient can advantageously be measured with a differentiation element that has only a few components.

The control unit becomes especially advantageous if the time constant of the differentiation element is variable. This allows simple adaptation of the control unit to various types of battery or conditions of use of the battery-operated device, particularly to the thermal time constants of an electric motor used. Resistors that change their resistance as a function of temperature have proved themselves as sensors.

Moving parts are not needed. To save battery power, it is favorable if the display is one that can be turned off. If an overload situation with respect to the battery or the electric unit arises, which was recognized by the exceeding of one of the predetermined limits, then advantageously the battery or the electric device is shut off.

Further advantages of the invention can be inferred from the description.

DRAWINGS

An exemplary embodiment of the invention is shown in the drawing and described in further detail in the description below.

DETAILED DESCRIPTIONS

Figure 1:
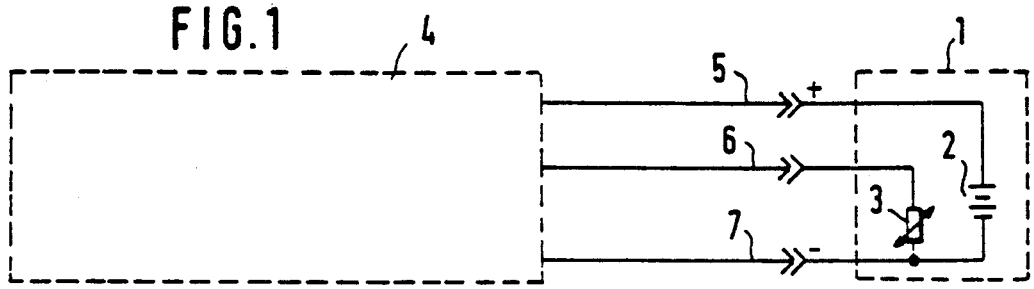
FIG. 1 shows a battery with a charging unit.

It is known that rechargeable batteries 2, for instance nickel-cadmium cells (NC cells), can be charged by a charging unit 4 during a fast charge To this end, the rechargeable battery 2 is connected to the charging unit 4 via suitable connections 5, 7. The batteries 2 are accommodated in a housing 1 (FIG. 1)

To protect the battery against excessive heating, which can occur at high power during the charging process, a temperature-dependent resistor 3 (sensor) is secured to the battery 2 in such a way that it is thermally coupled to it The temperature-dependent resistor 3 now measures the temperature of the battery 2 during the charging process and outputs a temperature-dependent signal to the charging unit 4, via a further connection 6 Via this connection 6, the charge current for the battery 2 is regulated as a function of the temperature of the battery 2.

Figure 2:
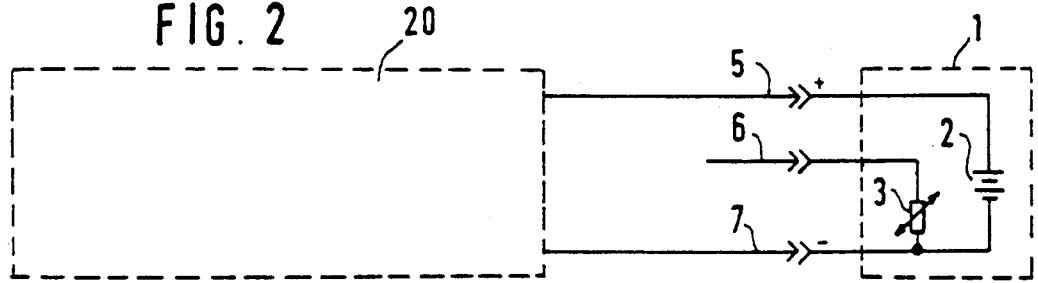
FIG. 2 shows a battery with an electric tool.

If the temperature reaches a certain value, then it is assumed that the battery 2 is now charged. The signal of the temperature-dependent resistor 3 is then used to turn off the charging unit 4. If the rechargeable battery 2 is connected to the electric device 20 as shown in FIG. 2, then the connection to the temperature-dependent resistor 3 is not needed. Only the two lines 5, 7 that lead to the battery 2 are used.

Based on this prior art, the free connection 6 is now used so as also to measure certain operating parameters during the battery operation.

Figure 3:
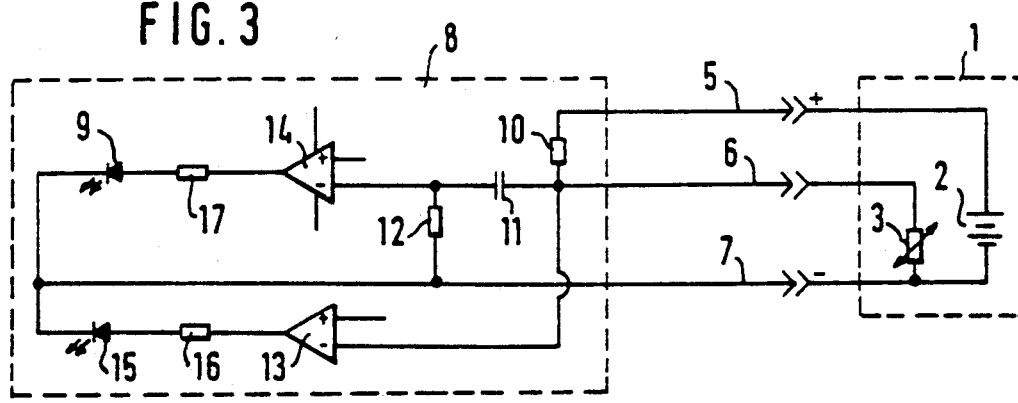
FIG. 3 shows an exemplary embodiment of the invention.
Figure 4:
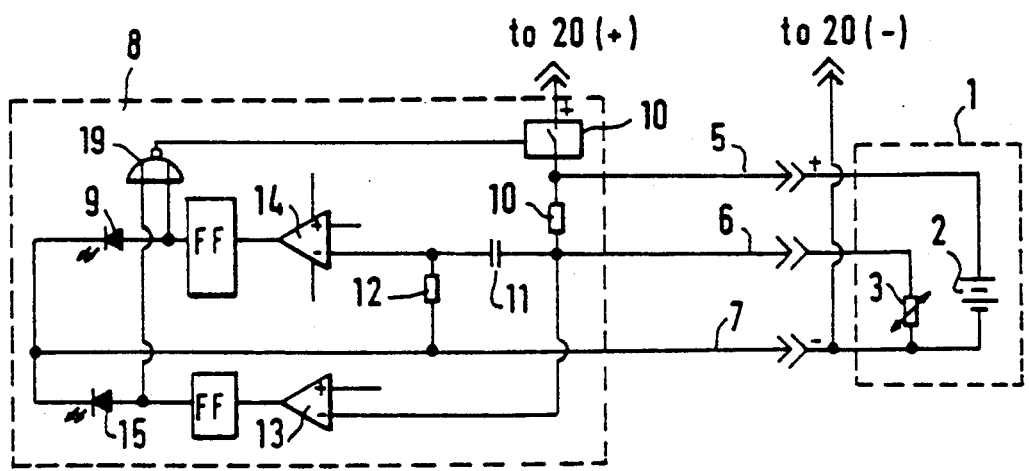
FIG. 4 shows another exemplary embodiment of the invention.

FIGS. 3 and 4 show exemplary embodiments in which during the battery-powered operation of the electric device 20, the free line 6 is connected to an evaluation circuit 8, 8'. The power supply to the evaluation circuit 8, 8' is likewise effected via the connections 5 and 7.

The arrangement of the evaluation circuit 8,8' may be selected such that it forms a unit with the housing 1 of the battery 2. In many applications, however, it is advantageous if the evaluation circuit 8,8' is connected to the housing of the electric device 20. It is especially advantageous that the display elements 9, 15 are located in the field of view of the user of the electric device 20. The electric device 20 itself is not shown; it may, for instance, be an electric tool or some household appliance.

The evaluation circuit 8,8' has two comparators 13, 14. The connection 6 is connected first directly to the inverting input of the comparator 13 and second, via a capacitor 11, to the inverting input of the comparator 14. A first resistor 10 is provided between the positive pole of the battery (connection 5) and the connection 6. A second resistor 12 is provided between the noninverting input of the comparator 14 and the negative line of the battery (connection 7). The outputs of the comparators 13, 14 are each connected to a respective display element 9, 15, which are returned jointly to the battery via the negative line 7. In the embodiment of FIG. 3, the outputs of comparators 13, 14 include respective protective resistor 16,17. The respective second inputs of the comparators 13, 14 predetermine the desired switching thresholds of the comparators 13, 14. They can be wired with resistors, so that the switching thresholds of the comparators 13, 14 can be selected arbitrarily. The wiring is not shown in detail because it is well-known. Light-emitting diodes (LEDs) are provided as display elements 9, 15. Naturally, other display elements may be used, such as LCDs and incandescent bulbs, among others

OPERATION

The mode of operation of the circuit is as follows:
The evaluation circuit 8,8' has the following functions:
1. overload display for the battery 2;
2. overload display for the electric device 20, which for instance is a motor.

The first resistor 10, along with the temperature-dependent resistor 3, which because of the thermal coupling with the battery 2 likewise assumes the temperature of the battery 2, forms a voltage divider, whose voltage at the center point is supplied to the inverting input of the comparator 13. As the temperature of the battery 2 increases, this voltage decreases. If this voltage reaches the threshold value set at the noninverting input, then the output of the comparator 13 switches to HIGH, so that the display element 15 is switched on. The lighting up of the display element 15 signals an overload of the battery 2. The circuit arrangement is shown for an NTC resistor 3; if a PTC resistor is used, suitable adaptation is required.

Naturally, this signal can also be used for other control tasks For example, with this signal the battery 2 can be switched off until the source of error has been eliminated.

The overload display of the battery-powered device 20 is based on the assumption that if there is a very heavy load on the battery-powered device 20, which for instance is an electric motor, then the temperature rise in the battery 2 takes place within a relatively brief time Via the RC element 11, 12, the temperature signal of the temperature-dependent resistor 3 is differentiated and supplied to the inverting input of the comparator 14. If the differentiated signal exceeds the predetermined threshold value, then the display element 9 indicates an overload of the battery-powered device 20.

The RC element 11, 12 is for instance adjustable via a variable resistor 12, so that an arbitrary temperature gradient can be selected. The selection of the time constants advantageously provides simple adaptation to the battery 2 or to the battery-powered device 20. In that case as well, the output signal of the comparator 14 can be used to turn off the battery-powered device 20 or the battery 2.

In the FIG. 4 embodiment of the invention, it is provided that the output signal of the comparator 14 be carried to a memory, for example to a flip-flop connected to its output side. The output of the flip-flop is connected to the display element 9. In case of an overload of the electric device 20, the flip-flop is then set in such a way that the display element 9 is steadily ON. The display does not go blank until the source of error has been eliminated.

The evaluation circuit 8' has the additional function of turning off the battery-operated device 20. For this purpose, an output with a switch S at the plus conductor of the battery is included. Switch S is controlled from an OR gate or a NOR gate 19. As switch S, a relay or semiconductor switch is suitable. The input of the OR gate is connected to the outputs of flip-flops FF.

We claim:

1. A control unit for a battery-operated device (20) having
a rechargeable battery (2) with two terminals; and
a temperature-dependent sensor (3) which is thermally coupled to the rechargeable battery (2), monitors the temperature of the rechargeable battery (2) during operation of the battery-operated device (20), and generates an output signal;
wherein, in accordance with the invention,
said temperature-dependent sensor has first and second connection leads;
said first connection lead of the sensor is connected to one of said battery terminals, and said second connection lead of the sensor acts as a control connection (6) to transmit said output signal; characterized in that
an evaluation circuit (8) is provided, having an input connected to said control connection (6) of the sensor during battery operation of the device (20), said evaluation circuit having means to detect a temperature gradient of the battery (2) during operation and to compare the temperature gradient to a predetermined limit value to monitor load on the device.

2. The control unit of claim 1, wherein said evaluation circuit comprises a differentiator (10,11,12) and a comparator (13,14) and outputs a signal if a predetermined threshold value of the temperature is exceeded.

3. The control unit of claim 1, wherein said evaluation circuit comprises a differentiator (10,11,12) and a comparator (13,14), and outputs a signal if a predetermined threshold value of the temperature is not reached.

4. The control unit of claim 1, wherein the evaluation circuit (8) includes a comparator (13, 14).

5. The control unit of claim 1, wherein said evaluation circuit (8) includes a differentiation element (10, 11, 12) for detecting said temperature gradient.

6. The control unit of claim 5, wherein a time constant of the differentiation element (10, 11, 12) is selectable.

7. The control unit of claim 1, wherein said sensor (3) is a Positive Temperature Coefficient (PTC) resistor.

8. The control unit of claim 2, wherein said sensor (3) is a Positive Temperature Coefficient (PTC) resistor.

9. The control unit of claim 3, wherein said sensor (3) is a Positive Temperature Coefficient (PTC) resistor.

10. The control unit of claim 4, wherein said sensor (3) is a Positive Temperature Coefficient (PTC) resistor.

11. The control unit of claim 1, further comprising a display element (9, 15) connected to an output of the evaluation circuit (8).

12. The control unit of claim 2, further comprising a display element (9, 15) connected to an output of the evaluation circuit (8).

13. The control unit of claim 3, further comprising a display element (9, 15) connected to an output of the evaluation circuit (8).

14. The control unit of claim 4, further comprising a display element (9, 15) connected to an output of the evaluation circuit (8).

15. The control unit of claim 5, further comprising a display element (9, 15) connected to an output of the evaluation circuit (8).

16. The control unit of claim 6, further comprising a display element (9,15) connected to a an output of the evaluation circuit (8).

17. The control unit of claim 1, further comprising means, connected to an output of said evaluation circuit, for turning off said battery-operated device (20) after the predetermined limit value is exceeded.

18. The control unit of claim 2, further comprising means connected to an output of said evaluation circuit, for turning off said battery-operated device (20) after the predetermined limit value is exceeded.

19. The control unit of claim 3, further comprising means, connected to an output of said evaluation circuit, for turning off said battery-operated device (20) after the predetermined limit value is exceeded.

20. The control unit of claim 4, further comprising means connected to an output of said evaluation circuit, for turning off said battery-operated device (20) after the predetermined limit value is exceeded.

* * * * *